United States Patent Office 3,316,330
Patented Apr. 25, 1967

3,316,330
FLUORINATED PHOSPHONITRILES
George M. Nichols, Homewood, Ill., assignor to E. I. du Pont de Nemours and Company, Wilmington, Del., a corporation of Delaware
No Drawing. Filed Apr. 3, 1964, Ser. No. 357,313
8 Claims. (Cl. 260—927)

The present invention relates to novel reaction products and methods for their preparation. These products, because of the wide range between their freezing points and boiling points, are useful as working fluids, high-temperature lubricants, chemical intermediates, and as plasticizers. They possess excellent thermal stability and exhibit the lowest pour points of any high-boiling cyclic phosphonitrile prepared and isolated to date.

In accordance with this invention, there are provided novel polymeric cyclic phosphonitriles selected from the group consisting of (a) phosphonitrilic compositions of the formula $P_mN_mR_nR'_{2m-n}$ wherein R is meta-trifluoromethoxyphenoxy, R' is phenoxy, $m$ is an integer from 3 to 7 and $n$ is an integer from 1 to 14, (b) mixtures comprising compositions of the formula $P_mN_mR_{2m}$, wherein R and $m$ are as defined above, and compositions of the formula $P_mN_mR_nR'_{2m-n}$, where R, R' and $m$ are defined above and $n$ is a cardinal number from 0 to 13 and (c) phosphonitrilic compositions of the formula $$P_mN_mR_xR'_yR''_z$$

wherein R is meta-trifluoromethoxyphenoxy, R' is phenoxy, R'' is meta-trifluoromethylphenoxy, $m$ is an integer from 3 to 7, $x$ equals at least 1, the sum of $x$, $y$, and $z$ is $2m$, and $y$ and $z$ are cardinal numbers from 0 to 14.

The polymeric cyclic phosphonitriles of this invention are prepared according to a process comprising reacting, at a temperature from about 60° C. to about 200° C., a polymeric phosphonitrilic halide of the formula $$P_mN_mX_{2m}$$

wherein $m$ is an integer from 3 to 7 and X is a halogen selected from the group consisting of fluorine and chlorine with a material selected from the group consisting of (1) an alkali salt of meta-trifluoromethoxyphenol; (2) a mixture of an alkali salt of meta-trifluoromethoxyphenol and an alkali salt of phenol; (3) a mixture of an alkali salt of meta-trifluoromethoxyphenol and an alkali salt of m-trifluoromethylphenol; and (4) a mixture of an alkali salt of meta-trifluoromethoxyphenol, an alkali salt of meta-trifluoromethylphenol and an alkali salt of phenol, with the proviso that when a mixture is selected at which one of the reactants is an alkali salt of phenol, the molar ratio of said alkali salt of meta-trifluoromethoxyphenol to said alkali salt of phenol is equal to or greater than 1 to 4 and the molor sum of said alkali salts of any particular said mixture per mole of phosphonitrilic halide is equal to at least $2m$ wherein $m$ is an integer of from 3 to 7.

In the process described above, the stoichiometric proportion of reactants is dependent on the product desired. For example, if it is desired to prepare a composition having the formula $P_3N_3R_6$ wherein R is meta-trifluoromethoxyphenoxy, i.e., hexakis (m-trifluoromethoxyphenoxy)triphosphonitrile,

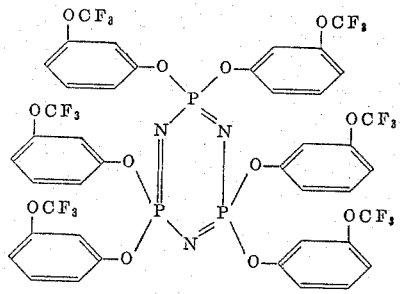

the moles of alkali salt of meta-trifluoromethoxyphenol used are equal to the number of polymeric phosphonitrilic halide used multiplied by twice the number of units of the phosphorus atom in the polymeric phosphonitrilic halide, i.e., at least six moles of the alkali salt of meta-trifluoromethoxyphenol are provided for each mole of the trimer. In preparing a phosphonitrile containing mixed groups, e.g. a phenoxy- and meta-trifluoromethoxyphenoxy-substituted phosphonitrile in which the principal product is tetraphenoxy-bis(meta-trifluoromethoxyphenoxy)triphosphonitrile, then the molar ratio of alkali salt of m-trifluoromethoxyphenol to the alkali salt of phenol is approximately 2:4, at least six moles of alkali salts being provided for each mole of phosphonitrilic halide trimer.

In order to obtain products liquid at room temperature or below and stable at temperatures up to 385° C., it is necessary when utilizing an alkali phenoxide in the process that the maximum amount of said alkali phenoxide present for each mole of alkali m-trifluoromethoxyphenoxide be four moles. When greater amounts than this are used, the product obtained is a solid and; therefore, cannot be used as a working fluid. However, any molar ratio of alkali phenoxide/m-trifluoromethoxyphenoxide below 4/1 can be used to obtain a satisfactory fluid material. Regardless of the molar ratio of alkali phenoxide/m-trifluoromethoxyphenoxide up to 4/1, the molar sum of the alkali phenoxide and alkali m-trifluoromethoxyphenoxide is at least equal to twice the number of phosphorus atoms, i.e., all of the halo atoms of the polymeric phosphonitrilic halide are replaced either by all m-trifluoromethoxyphenoxy groups or by a mixture of m-trifluoromethoxyphenoxy and phenoxy groups. However, when a product is desired having only meta-trifluoromethoxyphenoxy and meta-trifluoromethylphenoxy substituents, any molar ratio of the alkali salts is applicable, provided that the molar sum of the salts is equal to at least the number of halo atoms of phosphonitrilic halide for every mole of the polymeric halide.

The polymeric phosphonitrilic chlorides or fluorides suitable in this invention range from the trimers to the heptamers. The trimer or tetramer alone, or a mixture of the trimer to the heptamer may be used. The liquid fraction of polymeric phosphonitrilic chlorides may be obtained by the Schenck and Römer method described in Ber. 57B, 1343 (1924). The preferred polymeric phosphonitrilic halides are the readily available phosphonitrilic chloride trimer and tetramer.

The alkali salts, e.g., sodium and potassium (preferably potassium) of phenol, meta-trifluoromethoxyphenol, and meta-trifluoromethylphenol may be added to the reaction mixture as such, or the salts may be prepared in tu. The reaction is generally effected at a temperature between about 60° C. and about 200° C., preferably the range is between 120 and 145° C., until the condensation is essentially complete. Below a temperature of 60° C., the reaction is extremely slow and, therefore, economically unfeasible. Above a temperature of 200° C., the reaction, which is exothermic, is difficult to control. At the preferred temperature range between 120 and 145° C., the reaction period may range from 1 to 7 hours, preferably 5 to 7 hours, to ensure completion of the reaction.

The reaction may be effected with or without a solvent. However, since the reaction is exothermic it is cooled if no solvent is present. A water bath, or other cooling device, such as coils, is suitable for cooling the reaction. A solvent is required in the work-up of the product. The preferred procedure is to have a non-reactive solvent initially present. Suitable inert solvents are the aliphatic and aromatic hydrocarbons which boil between 60 and 200° C., and dissolve the polymeric phosphonitrilic halides, e.g., the xylenes (o-, m-, p-, or their mixtures), benzene, toluene, and petroleum ethers, and the halogenated aliphatic and aromatic hydrocarbons, such as chlorobenzene, sym-tetrachloroethane, and carbon tetrachloride. The amount of solvent used is not critical. Generally, the amount used is that necessary to facilitate product work-up and, in most cases, will range between 7 to 16 parts per part, by weight, of polymeric phosphonitrilic halide.

A non-reactive solvent, if not present during the reaction, is added to facilitate isolation of the product. The desired product is recovered by washing the solution with a dilute (approximately 5%, by weight) aqueous alkaline solution, e.g., potassium hydroxide, to dissolve alkali chloride, e.g. potassium chloride, formed as a by-product of the reaction and to dissolve any unreacted phenol, if present, and alkali phenoxides, separating the organic phase containing the desired product from the aqueous phase, rewashing the organic phase with aqueous alkali hydroxide solutions and then with dilute (approximately 5% by weight) aqueous sodium sulfate solution to remove any alkali hydroxide remaining in the organic layer, the aqueous phase being discarded after each wash, drying the organic phase over anhydrous sodium sulfate, filtering the sodium sulfate from the organic phase, treating the organic phase with activated charcoal to remove any color-imparting by-products, filtering the charcoal from the organic phase, removing the solvent from the organic phase, e.g., by distillation, and distilling the mixture at reduced pressure, the desired products boiling between 225 and 385° C. at 0.4 mm. Hg.

If desired, variations in the above recovery procedure may be introduced without departing from the scope of the invention. For example, the organic phase may be treated several times with the activated charcoal prior to distillation, or, optionally the desired products boiling between 225 and 385° C. at 0.4 mm. Hg may be treated with activated charcoal to insure recovery of a nearly colorless liquid product. The temperature and pressure at which the desired products are distilled is dependent on whether the desired material is a single compound or a mixture of phosphonitriles. For example, hexakis(m-trifluoromethoxyphenoxy)triphosphonitrile distills at 255° C. at 0.4 mm. Hg, whereas the mixtures of phosphonitriles distill within the range of 225 to 385° C. at 0.4 mm. Hg. Because of proximity of the boiling points of the individual components of the mixtures of the phosphonitriles, the individual components are very difficult to separate by ordinary separation means such as, for example, distillation. However isolation of specific components is not usually required since these mixtures are highly satisfactory fluids for most applications, the liquid range of these mixtures being within a few degrees of the liquid ranges of the phosphonitriles fully substituted with m-trifluoromethoxyphenoxy groups.

The compositions described in this invention have many properties which make them useful for high-temperature fluid applications such as lubricants for jet aircraft engines, flame-resistant hydraulic fluids and diffusion pump oils. All of these applications require fluids with good oxidation-corrosion resistance and good hydrolytic stability. For use as lubricants, the fluids should have (1) good temperature stability in an oxidative atmosphere, (2) low volatility, and (3) good load bearing properties. Diffusion pump oils for use in ultra-high vacuum systems, i.e., $10^{-9}$ mm. Hg and below, require fluids that have very low vapor pressures at room temperature, good thermal stability and good corrosion resistance. The novel compositions of this invention have very good oxidation-corrosion resistance, e.g., in the presence of aluminum, silver, titanium, mild steel, and stainless steel at 260° C. and higher, the product of Example 1 remained essentially unchanged for at least 24 hours and the weight change and appearance of the metals were negligible; these phosphonitriles are flame-resistant, hydrolytically stable, have low pour points, for example, hexakis(m-trifluoromethoxyphenoxy)triphosphonitrile has a pour point of $-31°$ C. which is the lowest of any phosphonitrile isolated to date; they are thermally stable and have very low evaporative losses as a result of their high boiling points, e.g., the compounds of this invention have a boiling point range of 225° C. to 385° C. at 0.4 mm. Hg. These novel compounds are also useful in a variety of other applications where thermal and chemical stability are important.

The following examples illustrate the invention in detail, however, they are not to be regarded as limiting the scope of the invention.

*Example 1*

A mixture of 8.1 parts (0.023 mole) of phosphonitrilic chloride trimer, 28 parts (0.157 mole) of m-trifluoromethoxyphenol, 9.0 parts (0.157 mole) of potassium hydroxide pellets, and 100 parts of p-xylene was charged to a three-necked flask equipped with a magnetic stirrer, thermometer, and reflux condenser. The reaction mixture was heated gradually to reflux at 112° C. Water separated by distillation as the temperature was increased from 112° C. to 140° C. Refluxing was continued at 140° C. for about five hours. The reaction mixture was cooled to 50° C. and washed successively with two 250-part portions of 10% aqueous potassium hydroxide solution and 250-part portions of 10% aqueous sodium sulfate solution, the aqueous layers being discarded in each case. The product solution was filtered to remove a small amount of sludge, dried over anhydrous sodium sulfate, filtered, and treated twice with 4 parts of "Nuchar C190" activated charcoal at 50° C., the charcoal being removed by filtration after each treatment. The p-xylene was then removed from the amber-colored solution by distillation. An amber liquid crude product (14.7 parts) remained and was distilled at reduced pressure to give 11.4 parts of a pale yellow liquid boiling at 255° C. at 0.4 mm. Hg. Infrared spectroscopy data and elemental analysis demonstrated the material to be hexakis(m-trifluoromethoxyphenoxy)triphosphonitrile. The material had a pour point of $-31°$ C., an index of refraction of $n_D^{25} = 1.4741$, and viscosities, of 44.3 centistokes at 38° C., 5.84 cs. at 99° C., and 1.25 cs. at 204° C. Elemental analysis of the material was as follows:

Calcd. for $P_3N_3O_{12}C_{42}H_{24}F_{18}$: P, 7.8; F, 28.5; N, 3.5; C, 42.1; H, 2.0; MW, 1197.

Found: P, 7.9; F, 24.5; N, 3.6; C, 42.1; H, 2.2; MW, 1148.

The infrared spectrum of this material is entirely consistent with the above-described product. A strong band at 1205 cm.$^{-1}$ is characteristic of the

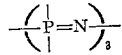

ring. The medium intensity band at 925 cm.$^{-1}$ demonstrates the presence of P—O—C where the C is in an aromatic ring. The presence of the benzene ring in the trifluoromethoxyphenoxy groups is shown by the medium C=C skeletal in plane vibration frequencies at 1597 and 1483 cm.$^{-1}$, the medium C—H out of plane deformation bands of a meta-substituted benzene ring at 887, 821 and 870 cm.$^{-1}$, and the medium intensity aromatic bands at 1005 and 989 cm.$^{-1}$. A broad and strong band at 1245 cm.$^{-1}$ is characteristic of the trifluoromethoxy groups.

When the product was subjected to any temperature up to at least 385° C. in an evacuated sealed "Pyrex" tube, the product remained stable, i.e., there was no significant change in appearance and physical properties, e.g., the viscosity and color, for at least 10 hours. The infrared spectrum was essentially the same before and after the test.

*Example 2*

A mixture of 58 parts (0.17 mole) of phosphonitrilic chloride trimer, 70.8 parts (0.40 mole) of meta-trifluoromethoxyphenol, 64.8 parts (0.40 mole) of meta-trifluoromethylphenol, 37.2 parts (0.40 mole) of phenol, 67.3 parts (1.2 mole) potassium hydroxide pellets, and 603 parts of p-xylene as solvent is charged to a flask as described in Example 1. The mixture is heated to reflux at 120 to 145° C. and heating is continued for 5 to 7 hours as 22 parts of water is collected. The reaction mixture is cooled to 25 to 30° C. and worked up as described in Example 1. The p-xylene is removed by distillation and the crude product mixture which remains is distilled at reduced pressure to give a pale yellow mixture of the formula $P_3N_3R_xR'_yR''_z$, wherein R is meta-trifluoromethoxyphenoxy, R' is phenoxy, R'' is meta-trifluoromethylphenoxy, and $x$, $y$, and $z$ are cardinal numbers with the proviso that the sum of $x$, $y$, and $z$ was 6, $x$ was at least 1, and $y$ and $z$ were 0–6.

*Example 3*

A mixture of 8.1 parts (0.017 mole) of phosphonitrilic chloride tetramer, 28 part (0.157 mole) of m-trifluoromethoxyphenol, 9.0 (0.157 mole) of potassium hydroxide pellets, and 100 parts of p-xylene is charged to a flask as described in Example 1. The reaction mixture is gradually heated to reflux. Water separates by distillation as the temperature is increased from reflux to about 120° C.–145° C. and heating is continued for 5 to 7 hours. The reaction mixture is cooled to room temperature and worked up as described in Example 1. The p-xylene is removed by distillation and the crude product mixture which remains is distilled at reduced pressure to give octakis(m-trifluoromethoxyphenoxy)triphosphonitrile.

The present invention has been described in detail in the foregoing. However, it will be apparent that many variations may be introduced without departing from the scope of the invention. It is intended, therefore to be limited only by the following claims.

I claim:
1. Polymeric phosphonitriles selected from the group consisting of (a) phosphonitrilic compositions of the formula $P_mN_mR_nR'_{2m-n}$, wherein R is meta-trifluoromethoxyphenoxy, R' is phenoxy, $m$ is an integer from 3 to 7 and $n$ is an integer from 1 to 14, (b) compositions of the formula $P_mN_mR_{2m}$ wherein R and $m$ are as defined above together with compositions of the formula $P_mN_mR_nR'_{2m-n}$, wherein R, R' and $m$ are defined above and $n$ is a cardinal number from 0 to 13, and (c) phosphonitrilic compositions of the formula $P_mN_mR_xR'_yR''_z$, wherein R is meta-trifluoromethoxyphenoxy, R' is phenoxy, R'' is meta-trifluoromethylphenoxy, and $m$ is an integer from 3 to 7, the sum of $x$, $y$, and $z$ is $2m$, $x$ equals at least 1, and $y$ and $z$ are cardinal numbers from 0 to 14.

2. Polymeric phosphonitriles of the formula $P_mN_mR_nR'_{2m-n}$, wherein R is meta-trifluoromethoxyphenoxy, R' is phenoxy, $m$ is an integer from 3 to 7 and $n$ is an integer from 1 to 14.

3. Polymeric phosphonitrilic compositions of the formula $P_mN_mR_{2m}$, wherein R is meta-trifluoromethoxyphenoxy and $m$ is 3 to 7 and compositions of the formula $P_mN_mR_nR'_{2m-n}$ wherein R is meta-trifluoromethyloxyphenoxy, R' is phenoxy, $m$ is an integer from 3 to 7 and $n$ is a cardinal number from 0 to 13.

4. Polymeric phosphonitrilic compositions of the formula $P_mN_mR_xR'_yR''_z$, wherein R is meta-trifluoromethoxyphenoxy, R' is phenoxy and R'' is meta-trifluoromethylphenoxy, $m$ is an integer from 3 to 7, the sum of $x$, $y$, and $z$ is $2m$, $x$ equals at least 1, and $y$ and $z$ are cardinal numbers from 0 to 14.

5. Hexakis(m-trifluoromethoxyphenoxy)triphosphonitrile.

6. Octakis(m-trifluoromethoxyphenoxy(tetraphosphonitrile.

7. Decakis(m-trifluoromethoxyphenoxy)pentaphosphonitrile.

8. Dodecakis(m-trifluoromethoxyphenoxy)hexaphosphonitrile.

References Cited by the Examiner

UNITED STATES PATENTS

| | | | |
|---|---|---|---|
| 2,109,491 | 3/1938 | Lipkin | 260—461 X |
| 2,192,921 | 3/1940 | Lipkin | 260—461 |
| 2,214,769 | 9/1940 | Lipkin | 260—461 X |
| 2,833,635 | 3/1958 | Hill | 260—461 X |
| 3,136,727 | 6/1964 | Nichols | 260—461 X |

OTHER REFERENCES

Shaw et al.: "Chemical Reviews," vol. 62, pp. 268–270 (1962).

CHARLES B. PARKER, *Primary Examiner.*

FRANK M. SIKORA, BERNARD BILLIAN,
*Assistant Examiners.*